United States Patent
Antony et al.

(10) Patent No.: US 11,106,785 B2
(45) Date of Patent: Aug. 31, 2021

(54) TIERED SCALABILITY SANDBOX FLEET WITH INTERNET ACCESS

(71) Applicant: Microsoft Technology Licensing, LLC, Redmond, WA (US)

(72) Inventors: Sajay Antony, Woodinville, WA (US); Bin Du, Redmond, WA (US); Bradley Thomas Haverstein, Kirkland, WA (US); Eric Hotinger, Redmond, WA (US); Nagalakshmi Duggaraju, Bellevue, WA (US); Steven M. Lasker, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 16/166,432

(22) Filed: Oct. 22, 2018

(65) Prior Publication Data

US 2020/0125721 A1    Apr. 23, 2020

(51) Int. Cl.
*G06F 21/53* (2013.01)
*G06F 9/455* (2018.01)

(52) U.S. Cl.
CPC .......... *G06F 21/53* (2013.01); *G06F 9/45558* (2013.01); *G06F 2009/45562* (2013.01);
(Continued)

(58) Field of Classification Search
CPC .............. G06F 21/53; G06F 9/45558; G06F 2009/45595; G06F 2009/45587;
(Continued)

(56) References Cited

U.S. PATENT DOCUMENTS

| 7,725,922 B2 | 5/2010 | Pouliot |
| 8,978,035 B2 | 3/2015 | McGrath et al. |

(Continued)

FOREIGN PATENT DOCUMENTS

WO    2017223226 A1    12/2017

OTHER PUBLICATIONS

Z. Zhang et al., "VMThunder: Fast Provisioning of Large-Scale Virtual Machine Clusters," in IEEE Transactions on Parallel and Distributed Systems, vol. 25, No. 12, pp. 3328-3338, Dec. 2014. [online][retrieved on Dec. 16, 2020], Retrieved from: IEEEXplore (Year: 2014).*

(Continued)

*Primary Examiner* — Kevin Bechtel
*Assistant Examiner* — Sangseok Park
(74) *Attorney, Agent, or Firm* — Ogilvie Law Firm

(57) ABSTRACT

A cloud-based fleet of sandboxes is scalable along two tiers. Additional sandboxes may be added to a particular sandbox network in a particular sandbox stack, or additional sandbox stacks may be added. Isolation of individual sandboxes within a sandbox network is provided by virtual switches or routers, and subnetting. Isolation of sandbox networks is provided by network or port address translation, and by running hypervisors in respective infrastructure-as-a-service virtual machines. Provisioning efficiency can be provided by the two-tiered architecture, by use of differencing disks, by use of virtual machine scale sets, and by hybrid core-count sandboxes. Sandboxes may be secured but still have outgoing internet connectivity. Workloads run in the sandbox may include builds, tests of development code, investigations of possible malware, and other tasks.

20 Claims, 7 Drawing Sheets

(52) U.S. Cl.
CPC ............. *G06F 2009/45587* (2013.01); *G06F 2009/45595* (2013.01)

(58) Field of Classification Search
CPC .......... G06F 2009/45562; H04L 29/00; H04L 49/70; H04L 61/2015; H04L 61/2061
See application file for complete search history.

(56) References Cited

U.S. PATENT DOCUMENTS

| | | | |
|---|---|---|---|
| 9,104,514 B2 | 8/2015 | Bravery et al. | |
| 9,652,273 B2 | 5/2017 | Davis et al. | |
| 2009/0249472 A1* | 10/2009 | Litvin | H04L 63/0263 726/14 |
| 2011/0022694 A1* | 1/2011 | Dalal | H04L 41/0856 709/222 |
| 2012/0131591 A1 | 5/2012 | Moorthi et al. | |
| 2015/0128245 A1* | 5/2015 | Brown | H04L 49/00 726/12 |
| 2016/0085576 A1* | 3/2016 | Chastain | G06F 9/45537 718/1 |
| 2017/0371693 A1 | 12/2017 | Corrie et al. | |
| 2018/0295099 A1* | 10/2018 | Kulper | G06F 9/455 |
| 2018/0316759 A1* | 11/2018 | Shen | H04L 67/1097 |
| 2019/0042298 A1* | 2/2019 | Sunku | H04L 49/70 |
| 2019/0213025 A1* | 7/2019 | Bade | G06F 9/5072 |

OTHER PUBLICATIONS

"Local Git Deployment to Azure App Service", retrieved from <<https://docs.microsoft.com/en-us/azure/app-service/app-service-deploy-local-git>>, Jun. 4, 2018, 12 pages.
"Sandbox (computer security)", retrieved from <<https://en.wikipedia.org/wiki/Sandbox_(computer_security)>>, Sep. 30, 2018, 3 pages.
Randy Bias, "Will Containers Replace Hypervisors? Almost Certainly)", retrieved from <<http://cloudscaling.com/blog/cloud-computing/will-containers-replace-hypervisors-almost-certainly/>>, May 17, 2016, 10 pages.
"Create a virtual network", retrieved from <<https://docs.microsoft.com/en-us/virtualization/hyper-v-on-windows/quick-start/connect-to-network>>, May 1, 2016, 6 pages.
"How to Make an Isolated Network", retrieved from <<https://blog.ligos.net/2016-07-28/How-To-Make-An-Isolated-Network.html>>, Jul. 28, 2016, 14 pages.
"What are virtual machine scale sets?", retrieved from <<https://docs.microsoft.com/en-us/azure/virtual-machine-scale-sets/overview>>, Mar. 26, 2018, 4 pages.
"Set up a NAT network", retrieved from <<https://docs.microsoft.com/en-us/virtualization/hyper-v-on-windows/user-guide/setup-nat-network>>, May 1, 2016, 10 pages.
"Run Hyper-V in a Virtual Machine with Nested Virtualization", retrieved from <<https://docs.microsoft.com/en-us/virtualization/hyper-v-on-windows/user-guide/nested-virtualization>>, Dec. 17, 2016, 7 pages.
Tomasz Janczuk, "Sandboxing Code in the Era of Containers", retrieved from <<https://aws.amazon.com/blogs/startups/sandboxing-code-in-the-era-of-containers/>>, Mar. 25, 2015, 10 pages.
Cheng (Charles) Ding, "Readme.MD", retrieved from <<https://github.com/charlieding/Virtualization-Documentation/tree/live/hyperv-tools/Nested>>, Jul. 6, 2017, 3 pages.

Hui W. Wu, "Using Differencing disks for VM deployment in Hyper-V", retrieved from <<https://medium.com/tech-jobs-academy/using-differencing-disks-for-vm-deployment-in-hyper-v-416a4f9b6d78>>, Mar. 9, 2016, 5 pages.
"IPv6 and NAT firewall effect", retrieved from <<https://security.stackexchange.com/questions/166460/ipv6-and-nat-firewall-effect>>, Jul. 31, 2017, 1 page.
"Version control", retrieved from <<https://en.wikipedia.org/wiki/Version_control>>, Sep. 22, 2018, 11 pages.
"Kubernetes", retrieved from <<https://en.wikipedia.org/wiki/Kubernetes>>, Sep. 19, 2018, 5 pages.
Daniel Gruss, et al., "Practical Memory Deduplication Attacks in Sandboxed JavaScript", retrieved from <<https://gruss.cc/files/dedup.pdf>>, 2015, 16 pages.
Lucian Constantin, "Pwn2Own hacking contest ends with two virtual machine escapes", retrieved from <<https://www.infoworld.com/article/3183126/security/pwn2own-hacking-contest-ends-with-two-virtual-machine-escapes.html>>, Mar. 20, 2017, 4 pages.
"Is it safe to use virtual machines when examining malware?", retrieved from <<https://security.stackexchange.com/questions/23452/is-it-safe-to-use-virtual-machines-when-examining-malware>>, Mar. 17, 2017, 3 pages.
Massimo, "Virtualization Sandbox Vs Cloud Sandbox (from an end-user perspective)", retrieved from <<http://www.t20.info/2010/11/virtualization-sandbox-vs-cloud-sandbox-from-an-end-user-perspective/>>, Nov. 15, 2010, 8 pages.
"Security best practices for IaaS workloads in Azure", retrieved from <<https://docs.microsoft.com/en-us/azure/security/azure-security-iaas>>, Sep. 17, 2018, 10 pages.
Sam Verboven, et al., "Evaluating Nested Virtualization Support", retrieved from <<https://www.researchgate.net/publication/235953591_Evaluating_Nested_Virtualization_Support/download>>, Feb. 2011, 9 pages.
"Cloud Build", retrieved from <<https://cloud.google.com/cloud-build/>>, no later than Sep. 19, 2018, 7 pages.
"Infrastructure as a service", retrieved from <<https://en.wikipedia.org/wiki/Infrastructure_as_a_service>>, Aug. 15, 2018, 2 pages.
"Virtualization", retrieved from <<https://en.wikipedia.org/wiki/Virtualization>>, Sep. 11, 7 pages.
"Grsecurity", retrieved from <<https://en.wikipedia.org/wiki/Grsecurity>>, Jul. 12, 2018, 5 pages.
"Hyper-V", retrieved from <<https://en.wikipedia.org/wiki/Hyper-V>>, Sep. 2, 2018, 13 pages.
"Full virtualization", retrieved from <<https://en.wikipedia.org/wiki/Full_virtualization>>, Mar. 2, 2018, 3 pages.
"Operating-system-level virtualization", retrieved from <<https://en.wikipedia.org/wiki/Operating-system-level_virtualization>>, Sep. 9, 2018, 4 pages.
"Linux-VServer", retrieved from <<https://en.wikipedia.org/wiki/Linux-VServer>>, Sep. 8, 2018, 3 pages.
"AppArmor", retrieved from <<https://en.wikipedia.org/wiki/AppArmor>>, Sep. 10, 2018, 4 pages.
"Docker security", retrieved from <<https://docs.docker.com/engine/security/security/>>, no later than Sep. 15, 2018, 7 pages.
"Docker as a sandbox for untrusted code", retrieved from <<https://security.stackexchange.com/questions/107850/docker-as-a-sandbox-for-untrusted-code>>, Dec. 11, 2015, 4 pages.
"Introducing nested virtualization for Google Compute Engine", retrieved from <<https://cloudplafform.googleblog.cm/2017/09/introducing-nested-virtualization-for.html>>, Sep. 28, 2017, 4 pages.
"Application as Filed in U.S. Appl. No. 15/857,585", filed Dec. 28, 2017, 49 Pages.

* cited by examiner

TIERED SCALABILITY SANDBOX FLEET WITH INTERNET ACCESS

BACKGROUND

Noon A "sandbox" is a computer security mechanism for running suspect programs with a decreased risk of damage to data or to other programs. A program may be considered suspect in the sense that it has a relatively high risk of containing a virus or other malware, or the program may be suspect merely because it has not yet undergone sufficient testing. Sandboxes are used to prevent or reduce harmful impact from program bugs, malware, or faulty configurations. Software may be executed in a sandbox, with test data as inputs, as a normal part of the software's development before it is cleared for release to a production environment. Programs may also be sandboxed if they are obtained from unverified or untrusted sources (program sources include, e.g., third parties, vendors, users, and websites). A sandbox is often designed to provide security by tightly controlling which memory, processor, network, disk, peripheral, and other resources, if any, the sandboxed program is allowed to access. For example, a sandbox often isolates the sandboxed program by denying or at least heavily restricting any network access, any calls to the operating system, and any queries about the host that is running the sandbox.

SUMMARY

Some teachings herein were motivated by an initial technical challenge of providing a cloud-based managed service to build and run untrusted code. One emergent technical challenge was how to isolate the untrusted code, and another emergent technical challenge was how to efficiently scale the service. In this context the inventors concluded that existing approaches lacked sufficient isolation capabilities and were badly hampered by resource utilization limits. The inventors identified several technical challenges, including how to provide secure isolation, how to provide flexibility for running various workloads, how to safely provide internet access, and how to efficiently scale resource utilization. Other technical challenges addressed by the innovations taught here will also be apparent to one of skill from the discussion provided below.

Some embodiments provide a tiered scalability sandbox fleet, with a sandbox fleet controller. The sandbox fleet includes one or more sandbox network stacks which communicate with the sandbox fleet controller. Each sandbox network stack has a stack isolation device that is configured to allow network communication from within the sandbox network stack to a wide area network (WAN). Each sandbox network stack also includes a sandbox network. Each sandbox network includes one or more sandboxes. Each sandbox includes a sandbox virtual machine, and also includes a sandbox isolation device that connects to the stack isolation device for network communication. The sandbox fleet is scalable at two tiers. The fleet is scalable at a sandbox tier by altering the number of sandboxes in a given sandbox network of a given sandbox network stack in the sandbox fleet. The fleet is also scalable at a stack tier by altering the number of sandbox network stacks in the sandbox fleet.

Some sandbox fleet embodiments provide or use particular actions. For example, an embodiment in a cloud may provision a sandbox network stack which includes a stack isolation device; the sandbox network stack is part of the sandbox fleet. The embodiment may assign the stack isolation device a set of one or more WAN-facing internet protocol addresses. The embodiment may also provision a sandbox network within the sandbox network stack, with the sandbox network including at least one sandbox. Each sandbox includes a sandbox virtual machine, a workload, and a sandbox isolation device. The embodiment may also assign to each sandbox isolation device in the sandbox network stack a respective set of one or more network protocol addresses. In this context, the embodiment may scale the sandbox fleet by altering the number of sandboxes in a given sandbox network of a given sandbox network stack in the sandbox fleet, or the embodiment may scale the sandbox fleet by altering the number of sandbox network stacks in the sandbox fleet, or the embodiment may scale the sandbox fleet by doing both sandbox number and stack number scaling. As used herein, "altering" a given number includes increasing the number or decreasing the number, or doing both at different times.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
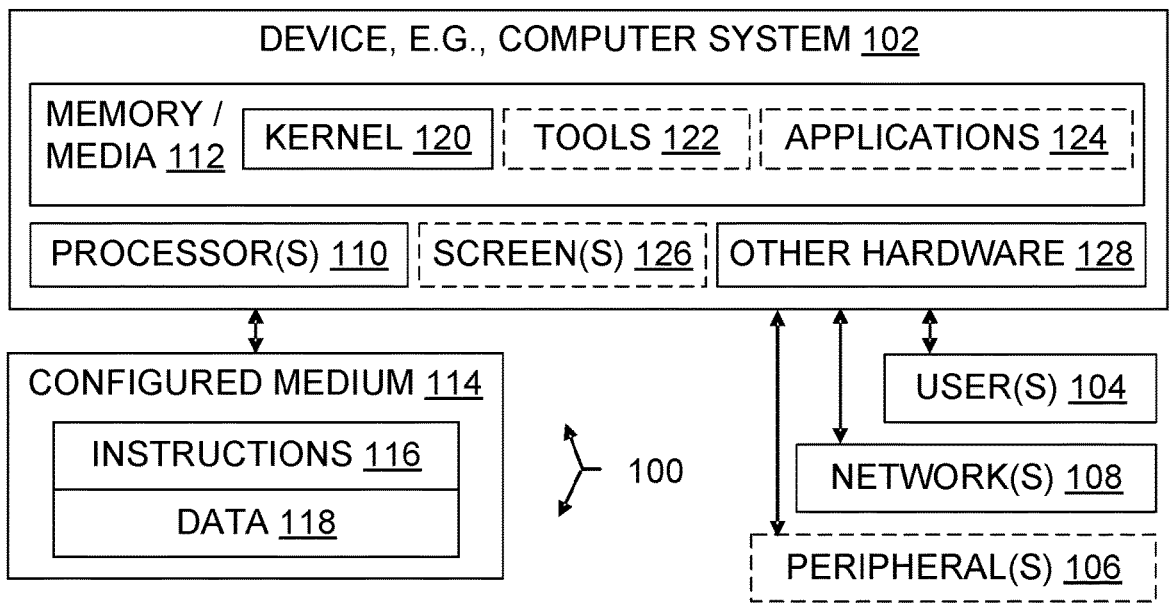
FIG. 1 is a block diagram illustrating a computer system and also illustrating a configured storage medium.

Innovations may expand beyond their origins, but understanding an innovation's origins can help one more fully appreciate the innovation even when the innovation has grown well beyond its original focus. In the present case, sandboxing innovations arose in a context which included seeking ways to improve software testing functionalities by improving the security and efficiency of those functionalities.

A managed build service in a cloud computing environment has greater functionality if it can safely build and run untrusted code than if it cannot. In a relatively secure multi-tenant cloud, such a service would also be facilitated by provisioning an isolated sandbox for each tenant so that the service can reduce or prevent the intrusion of potentially hostile codes.

Achieving such service functionality presents several challenges. A sandbox should be completely isolated from other sandboxes and also from its host environment. The environment provided by each sandbox should be flexible to run various workloads. The environment provided by each sandbox should have internet access. The service solution should be able to manage and scale the sandbox fleet efficiently to maximize resource utilization. A given embodiment may have one or more of these capabilities, achieved according to teachings discussed herein.

One alternative approach to providing a secure build service would involve merely leasing a virtual machine, e.g., an Azure® IaaS VM as the build sandbox (mark of Microsoft Corporation). One negative aspect of this approach is that the untrusted code is running in an environment (an IaaS VM) which is usually directly connected to the cloud computing environment's service network backbone. Another negative aspect is the relatively long time that would be spent to provision the sandbox in the cloud, which would severely hamper use of this approach with massive (e.g., hundreds or thousands of workload instances) build workloads. Advance provisioning to avoid those delays would tend to result in overprovisioning to maintain a large pool ready, which is not an economic or efficient example of resource management.

Another alternative approach to providing a secure build service would involve merely leasing a container, e.g., a Docker® container, for use as the build sandbox (mark of Docker, Inc.). However, such container technology is not yet widely established as providing a safe sandboxed highly isolated environment. Another negative aspect of this approach is that the container sandbox may well be limited to utilizing only the resources of the single container.

Accordingly, other approaches described herein were conceived and developed. In some, multiple mechanisms of isolation are provided, at each individual sandbox, at each sandbox network, and at each sandbox network stack. Rapid provisioning is available in some through virtual machine scale sets, or through provision of additional sandboxes within an established sandbox network, or both. Massive up-scaling is supported in some through provision of additional sandbox network stacks. Security and efficient resource utilization are enhanced in some by managed service controller implementation. Efficient resource utilization is also enhanced in some embodiments by the flexible granularity of two-tiered scaling. Other advantages of particular embodiments will also become apparent to one of skill in the art.

Some embodiments described herein may be viewed by some people in a broader context. For instance, concepts such as isolation, networks, provisioning, scaling, and virtualization may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to prioritize alerts. Other configured storage media, systems, and methods involving isolation, networks, provisioning, scaling, or virtualization are outside the present scope. Accordingly, vagueness, mere abstractness, lack of technical character, and accompanying proof problems are also avoided under a proper understanding of the present disclosure.

Acronyms, Abbreviations, and Names

Some acronyms, abbreviations, and names are defined below. Others are defined elsewhere herein, or do not require definition here in order to be understood by one of skill.

ACR: Azure® Container Registry
ALU: arithmetic and logic unit
API: application program interface
ARM: Azure® Resource Manager
BIOS: basic input/output system
CD: compact disc
CLI: command line interface
CPU: central processing unit
DHCP: dynamic host configuration protocol
DVD: digital versatile disk or digital video disc
FPGA: field-programmable gate array
FPU: floating point processing unit
GPU: graphical processing unit
GUI: graphical user interface
IDS: intrusion detection system generally, may be a HIDS (host-based IDS) or a NIDS (network-based IDS), for example
IaaS or IAAS: infrastructure-as-a-service
IoT: internet of things
IP: internet protocol
LAN: local area network
OS: operating system
PaaS or PAAS: platform-as-a-service
RAM: random access memory
ROM: read only memory
RP: resource provider
SCM: source control management
UEFI: Unified Extensible Firmware Interface
VCS: version control system
VM: virtual machine
VMSS: virtual machine scale set
VS: Visual Studio® program (mark of Microsoft Corp.)
VS Code: Visual Studio® Code program (mark of Microsoft Corp.)
VSTS: Visual Studio® Team Services
WAN: wide area network Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network or computing system environment.

"Cloud" means pooled resources for computing, storage, and networking which are elastically available for measured on-demand service. A cloud may be private, public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as provisioning virtual machines, assigning IP addresses, and executing code, are understood herein as inherently digital. A human mind cannot interface directly with a CPU or other processor, or with RAM or other digital storage, to read and write the necessary data to perform the sandboxing steps taught herein. This would all be well understood by persons of skill in the art in view of the present disclosure, but others may sometimes need to be informed or reminded of the facts. Unless stated otherwise, embodiments are presumed to be capable of operating at production scale (i.e., operating with one hundred or more sandbox virtual machines at a time) in commercial production environments, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as altering, assigning, configuring, controlling, creating, decreasing, deploying, differencing, executing, identifying, increasing, isolating, preventing, provisioning, reporting, running, scaling, (and alters, altered, assigns, assigned, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

Figure 10:
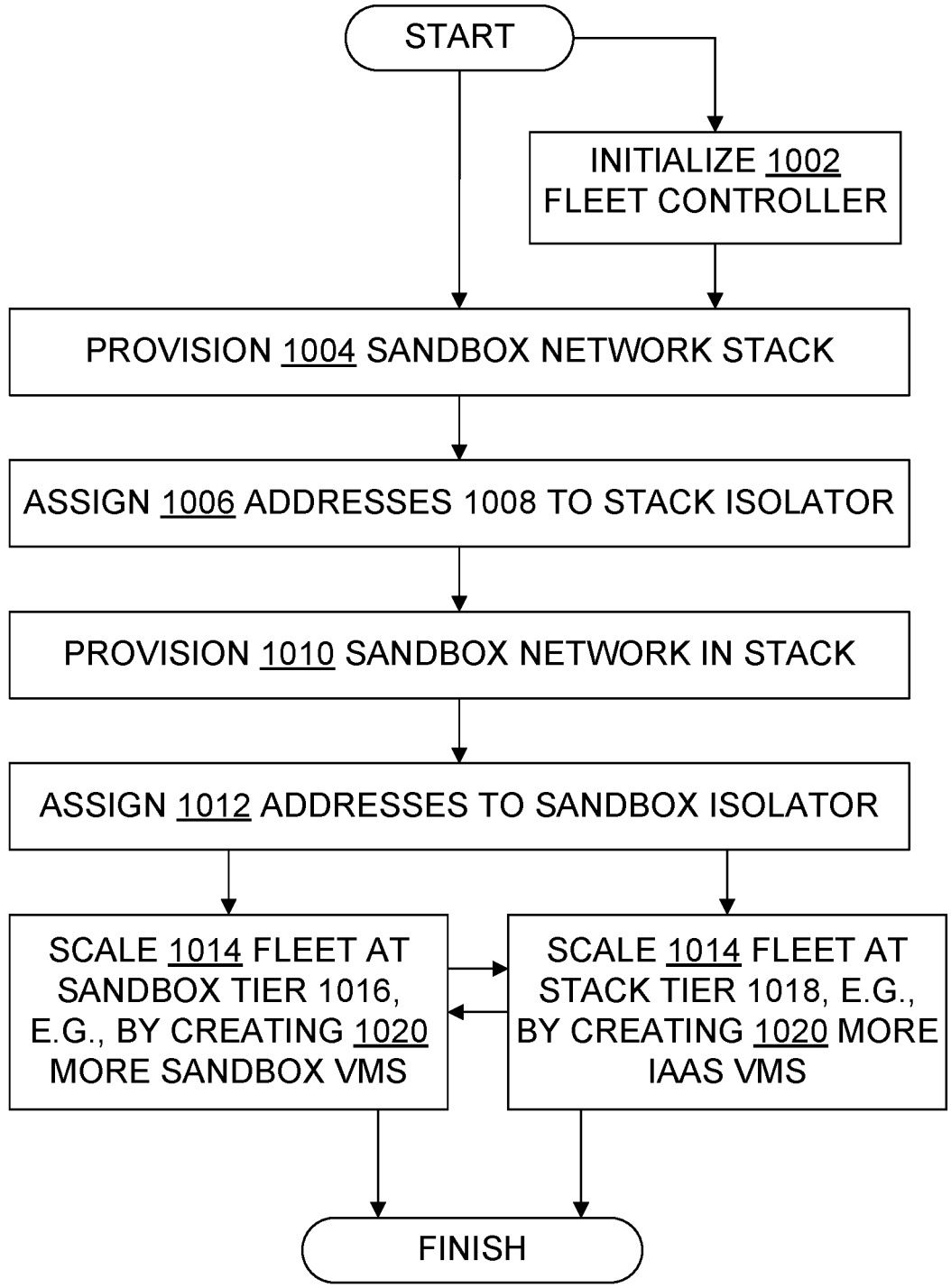
FIG. 10 is a flowchart illustrating steps in some sandbox fleet tiered scaling methods.
Figure 11:
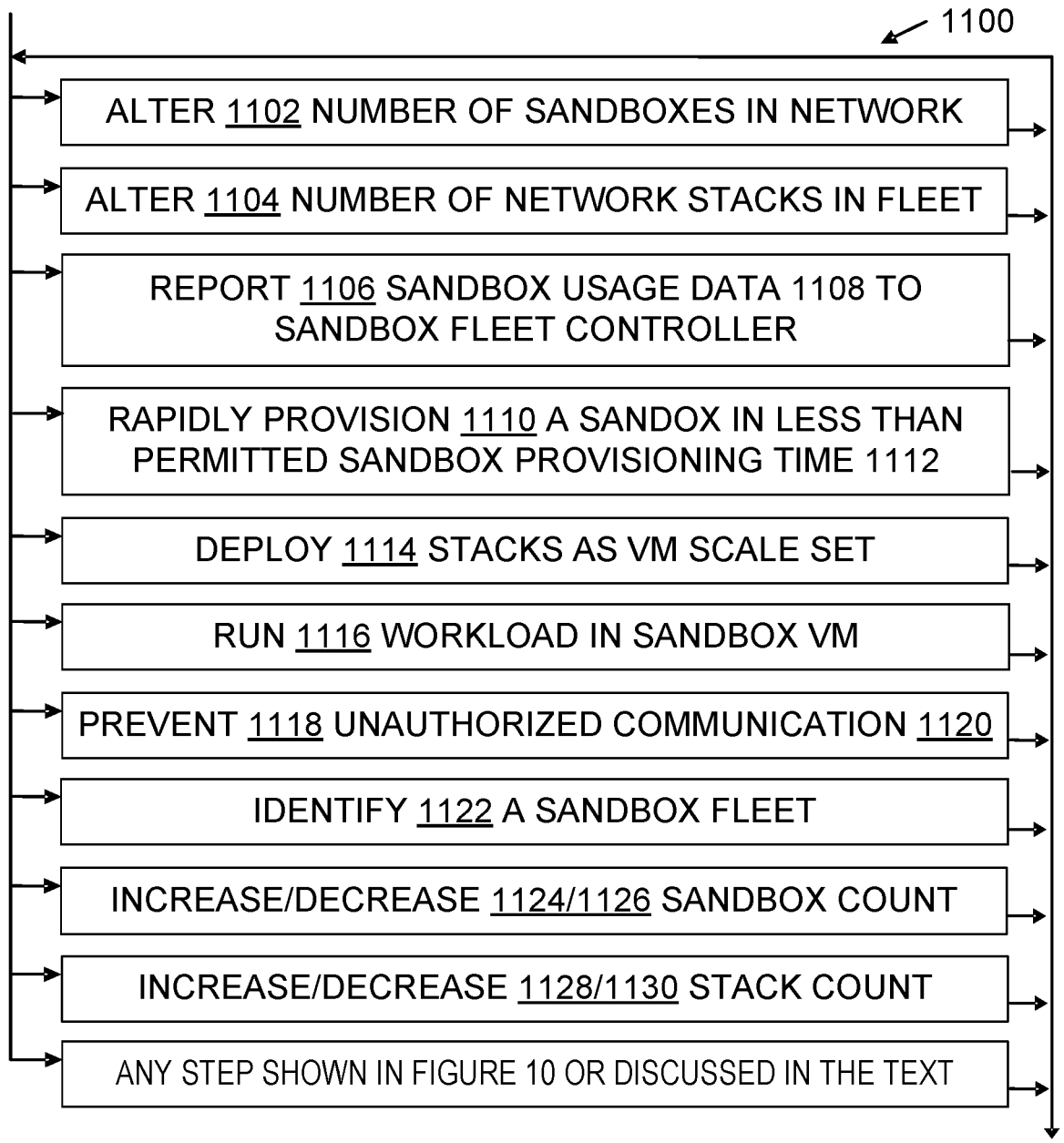
FIG. 11 is a flowchart further illustrating steps in some sandbox fleet methods.

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems (IDS), intrusion prevention systems (IPS), debuggers, profilers, compilers, interpreters, static code analysis tools, software development tools and tool suites, hardware development tools and tool suites, diagnostics
124 applications, e.g., word processors, web browsers, spreadsheets, games, email tools
126 display screens, also referred to as "displays"
128 computing hardware not otherwise associated with a reference number 106, 108, 110, 112, 114
202 sandbox fleet system; may also be referred to as "sandbox fleet computing system", or "sandbox fleet service", "build service", or another term in a given example; an example of a system 102
204 sandbox fleet; also referred to as "fleet"
206 sandbox fleet controller; also referred to as "fleet controller" or "controller"
208 hardware supporting operations in sandbox fleet system, e.g., processors 110, memory 112, network cards 128, and other computing system hardware
210 wide area network, e.g., the internet, a metropolitan area network, or another routed network using IP addresses
212 sandbox network stack; also referred to as "sandbox stack" or "stack"
214 sandbox network stack isolation device(s), namely, one or more physical or virtual devices which provide isolation of the interior of a given sandbox network stack from devices outside that sandbox network stack
216 sandbox network
218 sandbox
220 virtual machine running or providing sandbox functionality
222 sandbox isolation device(s), namely, one or more physical or virtual devices which provide isolation of the interior of a given sandbox from devices outside that sandbox
224 Integrated Development Environment (IDE)
226 developer system; an example of a system 102
500 cloud; may also be referred to as "cloud environment" or "cloud computing environment"; may be a public, private, hybrid, or community cloud
502 platform-as-a-service virtual machine
504 infrastructure-as-a-service virtual machine
506 managed service, namely, one which runs directly on cloud hardware as opposed to running in an IaaS or PaaS virtual machine
508 cloud hardware; when running a sandbox service, cloud hardware 508 is an example of sandbox fleet system hardware 208
510 virtual switch; a switch controls packet flow based on a layer 2 address such as a media access control (MAC) address
512 virtual router; a router controls packet flow based on a layer 3 address such as an IP address
514 virtual firewall
516 virtual network address translation (NAT) device or port address translation (PAT) device; although one of skill recognizes a difference between NAT and PAT devices, as used herein "NAT" means "NAT or PAT" unless stated otherwise
602 compute hardware in cloud; this is an example of cloud hardware 508 which performs or directly supports computation
604 network hardware in cloud; this is an example of cloud hardware 508 which performs or directly supports networked communication
606 storage hardware in cloud; this is an example of cloud hardware 508 which performs or directly supports data storage
608 central monitor portion of one implementation of sandbox fleet controller 206
610 central event hub portion of one implementation of sandbox fleet controller 206
612 hypervisor
614 sandbox fleet stack supervisor
616 DHCP server
618 program launcher or runner (or both) tool
620 workload which runs in sandbox, e.g., a untested or untrusted program to be executed in a sandbox, or executing in a sandbox
702 differencing disk
704 base disk
802 processor core
902 builder task; an example of a workload 620 that can be run in a sandbox
904 container or virtual machine orchestration software
906 resource provider
908 scheduler
910 task service
912 source control service, e.g., Azure® Kudu engine (mark of Microsoft Corporation), Visual Studio® Team Services (mark of Microaoft Corporation), or GitHub® service (mark of GitHub, Inc.)
914 base image monitor
916 billing software
918 resource manager
920 version control system
922 virtual machine scale set (VMSS), namely, a set or pool of identical virtual machines usable to build large-scale services for cloud compute, network, or storage functionality
924 storage for sandbox fleet
926 registry metadata
928 registry storage 930 base image record
932 task tracker
1000 flowchart; 1000 also refers to sandbox fleet tiered scaling methods, including methods illustrated by or consistent with the FIG. 10 flowchart
1002 initialize a sandbox fleet controller
1004 provision a sandbox network stack
1006 assign one or more addresses to a sandbox network stack isolation device
1008 IP address
1010 provision a sandbox network, or an individual sandbox
1012 assign one or more addresses to a sandbox isolation device
1014 scale a fleet of one or more sandboxes, e.g., by increasing or decreasing the number of items in the fleet
1016 sandbox tier of a sandbox fleet, namely, tier at which individual sandboxes are located in a nested virtualization hierarchy
1018 stack tier of a sandbox fleet, namely, tier at which sandbox network stacks are located in a nested virtualization hierarchy
1020 create a virtual machine
1100 flowchart; 1100 also refers to sandbox fleet methods, including methods illustrated by or consistent with the FIG. 11 flowchart
1102 alter number of sandboxes in a sandbox network of a stack in a fleet
1104 alter number of sandbox stacks in a fleet
1106 report sandbox usage data or other data 1108 to a sandbox fleet controller
1108 sandbox usage data, sandbox counts, stack counts, sandbox status, stack status, sandbox characteristics, stack characteristics, or other data 118 pertaining to the capacity, status, operation, or operation results of part or all of a sandbox fleet
1110 rapidly provision a sandbox, namely, provision a sandbox in less than a specified sandbox provisioning time 1112
1112 sandbox provisioning time
1114 deploy one or more sandbox stacks using a virtual machine scale set
1116 run a workload in a sandbox; may also be referred to as executing a workload
1118 prevent at least one unauthorized communication, or close at least one channel or path or avenue for unauthorized communication
1120 unauthorized communication, namely, a communication which violates a policy, a law, a regulation, a contract or another legal agreement, or violates a customary or standard or other boundary, e.g., between cloud tenants or between a cloud tenant and a cloud service provider
1122 identify a sandbox fleet
1124 increase the number of sandboxes in a fleet
1126 decrease the number of sandboxes in a fleet
1128 increase the number of sandbox stacks in a fleet
1130 decrease the number of sandbox stacks in a fleet Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security personnel, operations personnel, developers, testers, engineers, auditors, and end-users are each a particular type of user 104. Automated agents, scripts, playback software, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

A given operating environment 100 may include an Integrated Development Environment (IDE) 224 which provides a developer with a set of coordinated computing technology development tools such as compilers, source code editors, profilers, debuggers, layout tools, simulators, and so on. In particular, some of the suitable operating environments for some software development embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C # ("C-Sharp"), but many teachings herein are applicable with a wide variety of programming languages, programs, programming models, development tools, and development methodologies.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, data structures, or functionalities for instance, and may otherwise depart from the examples provided herein.

Figure 2:
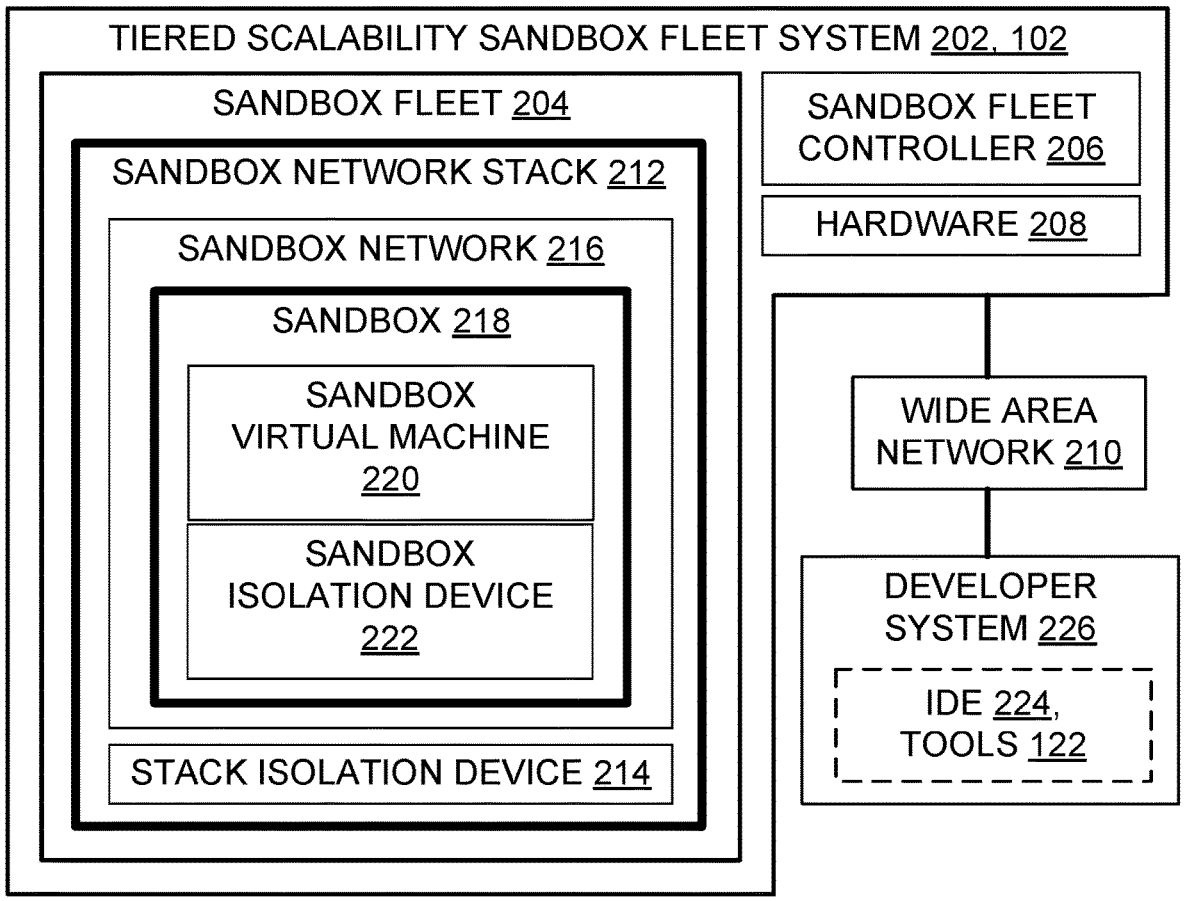
FIG. 2 is a block diagram illustrating aspects of a tiered scalability sandbox fleet computing system.

FIG. 2 illustrates aspects of an architecture for a tiered scalability sandbox fleet system 202, which is an example of a computing system 102. The system 202 includes hardware 208 running a fleet 204 that contains one or more sandboxes 218. The fleet 204 is organized for scalability in at least two tiers, namely, a sandbox tier at the level of the individual sandboxes 218 and a stack tier at the level of sandbox network stacks 212. The fleet components report to a controller 206, which may also send commands to scale the fleet. Each stack 212 includes a network 216 of one or more sandboxes 218, and also includes a stack isolation device 214. Each sandbox 218 includes a virtual machine 220 and a sandbox isolation device 222. The fleet communicates with a wide area network 210 such as the internet, and with a developer system 226 which includes an IDE 224 or other development tools 122.

Figure 3:
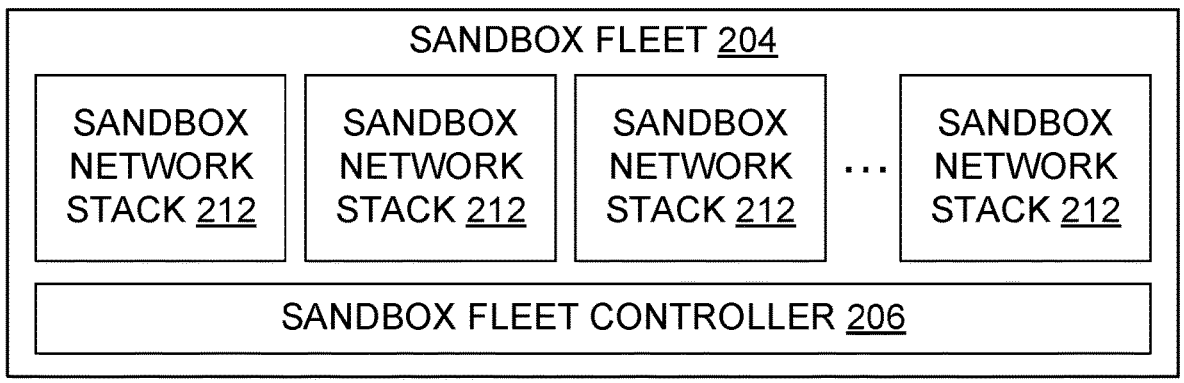
FIG. 3 is a block diagram illustrating scalability of a sandbox fleet at a stack tier.

FIG. 3 shows the stack tier of a fleet. The fleet is scalable at the stack tier by adding or removing individual sandbox network stacks 212.

Figure 4:
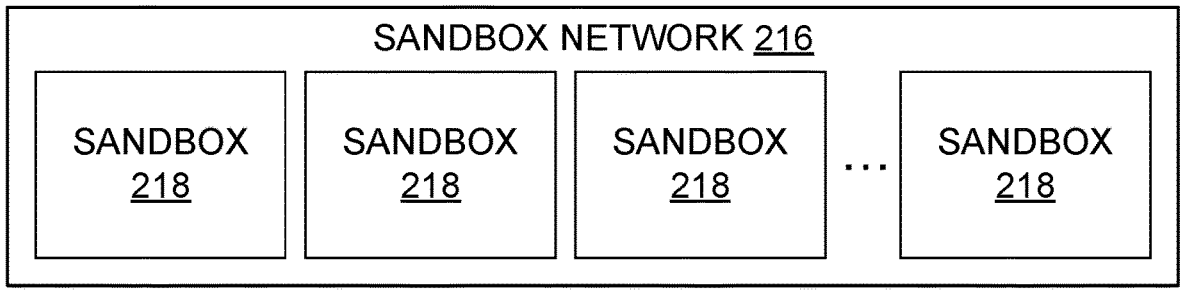
FIG. 4 is a block diagram illustrating scalability of a sandbox fleet at a sandbox tier.

FIG. 4 shows the sandbox tier of a fleet within a particular stack 212. The fleet is scalable at the sandbox tier by adding or removing individual sandboxes 218.

Figure 5:
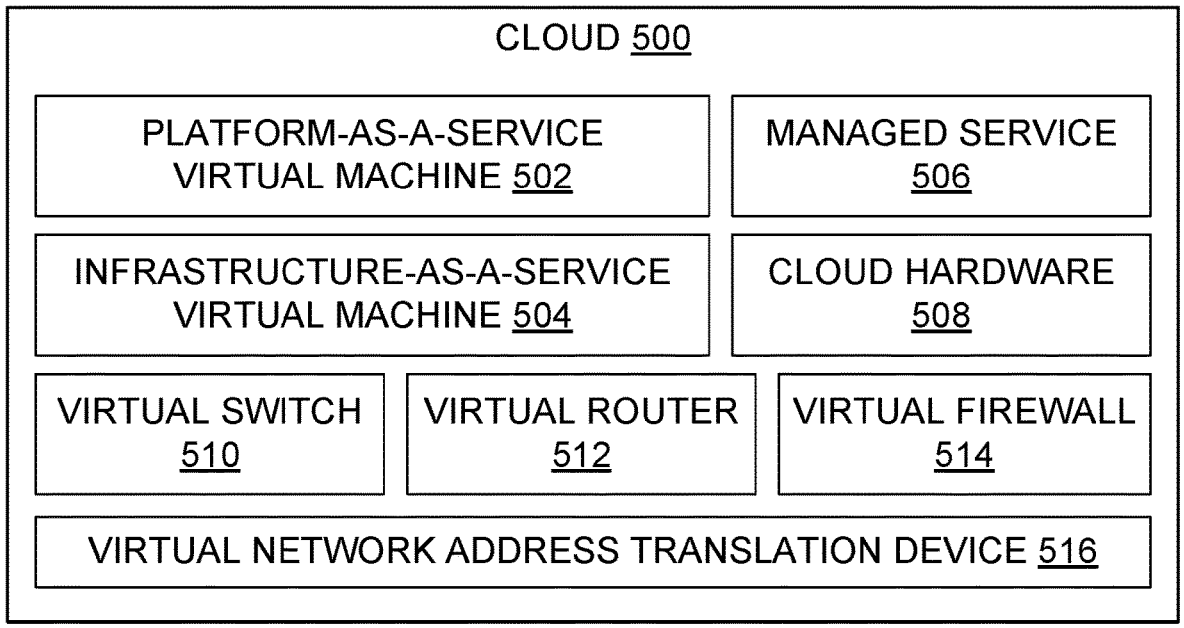
FIG. 5 is a block diagram illustrating aspects of items in a cloud which may be configured into a sandbox fleet.

FIG. 5 shows some items in a cloud 500 which may be configured into a sandbox fleet 204. Other items not shown may also be used when implementing a fleet 204. Items 502, 504, 510, 512, 514, 516, which are described as "virtual" devices or machines, include software implementations of the device or machine in question, and may run on general purpose or special purpose hardware. A given fleet 204 may include zero, one, or more instances of a particular item. The items shown include a platform-as-a-service virtual machine (PaaS VM) 502, an infrastructure-as-a-service virtual machine (IaaS VM) 504, a managed service 506, cloud hardware 508, a virtual switch 510, a virtual router 512, a virtual firewall 514, and a virtual NAT or PAT device 516.

Figure 6:
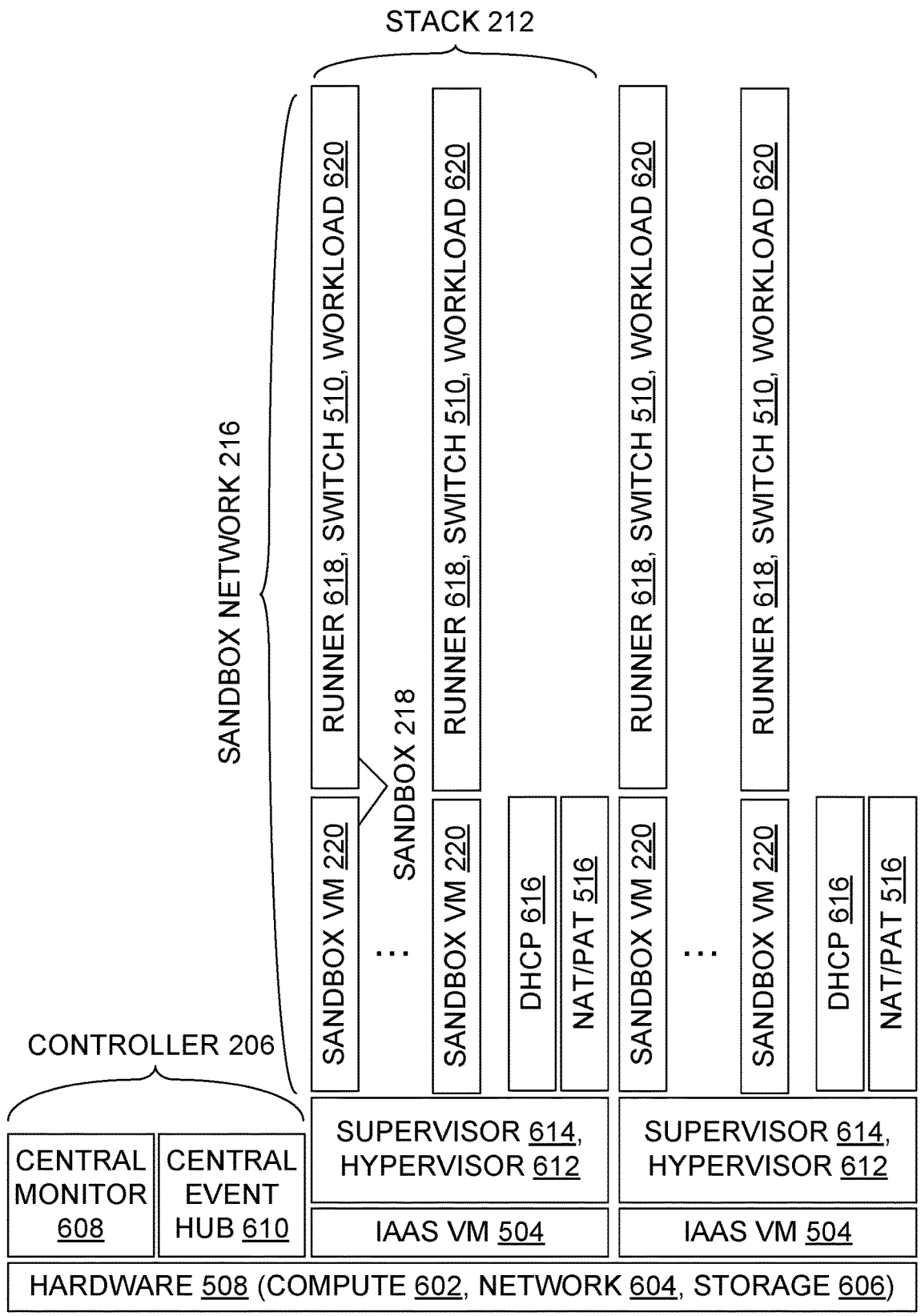
FIG. 6 is a block diagram illustrating controller, stack, and network aspects of an architecture suitable for implementing a sandbox fleet in a cloud.

FIG. 6 illustrates a fleet architecture. In this example, the fleet controller 206 includes a central monitor 608 and a central hub 610 which run on cloud hardware 508 as a managed service 506. The cloud hardware 508 includes compute hardware 602, network hardware 604, and storage hardware 606, with accompanying operational firmware and other software to perform compute, network, or storage functions, respectively.

FIG. 6 also shows two sandbox network stacks 212; a given fleet 204 may contain one, two, or more stacks 212. In this example, each stack 212 is built on a supervisor 614 and a hypervisor 612 running in an IaaS virtual machine 504. In an alternate architecture which is not shown, a PaaS VM 502 is used instead of an IaaS VM. The VM 502 or 504 provides some isolation, which is enhanced by use of the hypervisor 612. The supervisor 614 includes custom code to set up and manage the sandbox network 216. The hypervisor 612 provides kernel services and some isolation. The hypervisor 612 may be a familiar hypervisor, such as a Type I (bare metal or native) hypervisor, which presents a smaller attack surface than Type II hypervisors. Some suitable examples include a Hyper-V® hypervisor (mark of Microsoft Corporation), an ESXi (formerly ESX®) hypervisor (mark of VMWare, Inc.), a KVM (Kernel-based Virtual Machine), and other available virtualization software.

As also shown in the FIG. 6 example, this sandbox network 216 includes a virtual NAT/PAT device 516 to isolate the sandbox network 216, a DHCP server 616 to support communications within the sandbox network 216, and multiple sandboxes 218 within the network 216 for running untested or untrusted workloads 620. Each sandbox 218 in this example includes a sandbox virtual machine 220, a runner 618, a virtual switch 510, and a workload 620 for the runner 618 to run in the virtual machine 220 behind the isolating switch 510.

Figure 7:
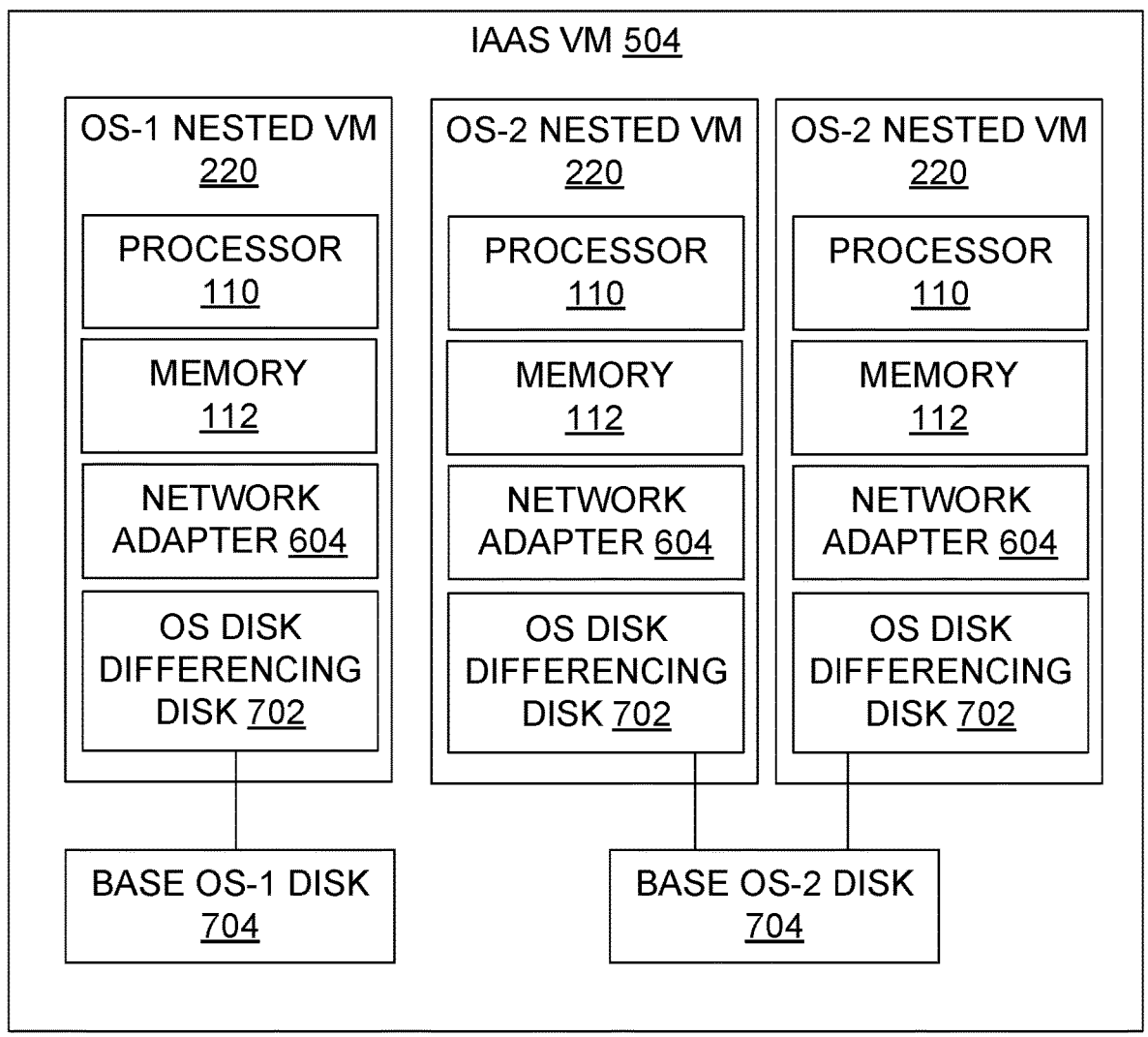
FIG. 7 is a block diagram illustrating nested virtual machine and operating system differencing disk aspects of an architecture suitable for implementing a sandbox fleet in a cloud.

FIG. 7 illustrates aspects of an example fleet architecture which is compatible with the FIG. 6 example in that both examples include a network of sandbox VMs 220 nested in an IaaS VM 504. In the FIG. 7 example, operating system differencing disks 702 are employed. A differencing disk 702 in this example is a virtual disk configured with an instance of an operating system based on an underlying template disk 704 (denoted here the "base" disk). The differencing disk 702 stores changes made to a copy of the base disk, such as changes in a virtual disk that is used as data storage or changes in a guest operating system. For instance, in the FIG. 7 example, "OS-1" could denote a Windows® operating system (mark of Microsoft Corporation) while "OS-2" denotes a Linux® operating system (mark of Linus Torvalds). The differencing disks 702 would be subject to read or write permissions, whereas the base OS disks 704 would be read-only disks.

Figure 8:
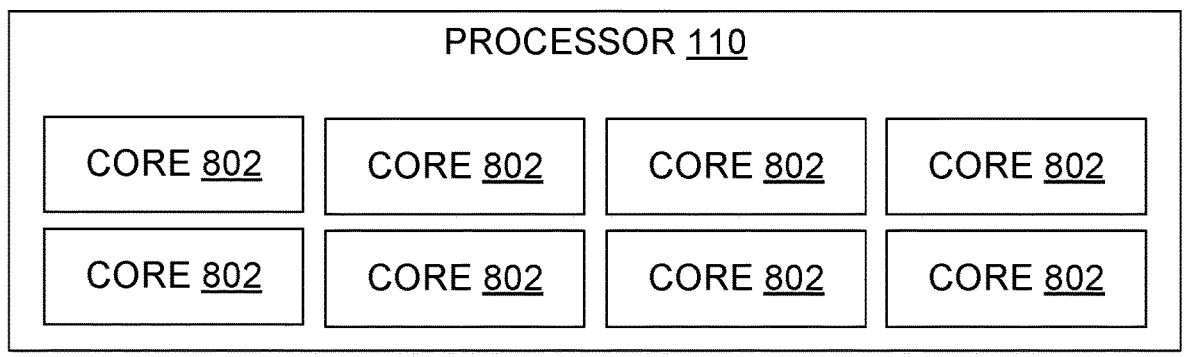
FIG. 8 is a block diagram illustrating a multi-core processor.

FIG. 8 illustrates a multi-core processor 110. In this example, the multi-core processor 110 has eight cores 802. However, a given multi-core processor 110 may have two, three, four, five, six, seven, eight, or more cores.

Figure 9:
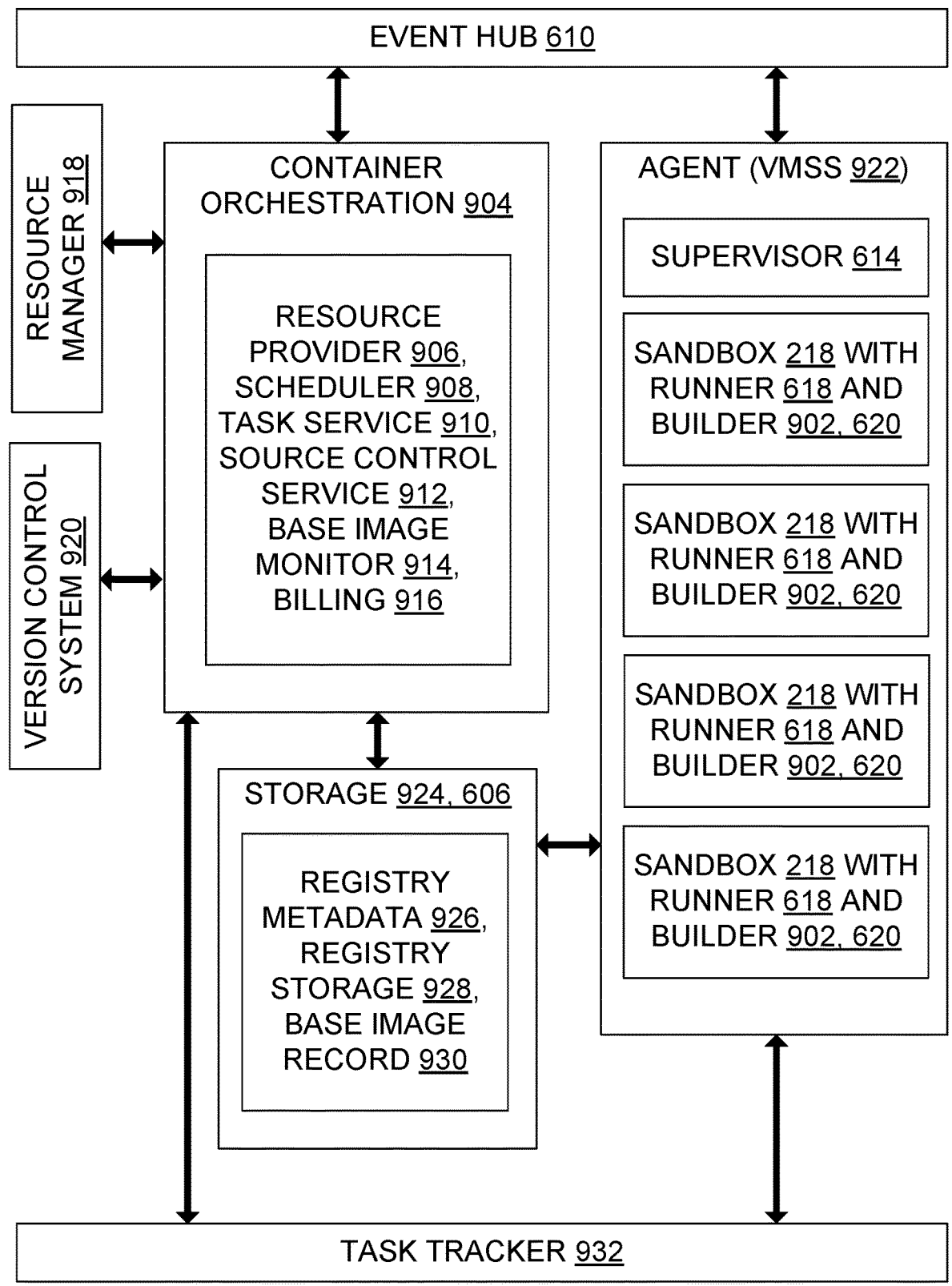
FIG. 9 is a block diagram illustrating orchestration and virtual machine scale set (VMSS) aspects of an architecture suitable for implementing a sandbox fleet in a cloud.

FIG. 9 shows aspects of another sandbox fleet architecture. An event hub 610, such as an Azure® service bus (mark of Microsoft Corporation) or similar cloud service bus, communicates with a container orchestration module, such as Kubernetes® code (mark of The Linux Foundation) or the like. The illustrated orchestration module 904 includes a resource provider 906, scheduler 908, task service 910, source control service 912, base image monitor 914, and billing software 916. In alternative implementations, one or more of these inclusions are omitted, or their functionality is combined or externalized. This orchestration module 904 also communicates with a resource manager 918, such as Azure® Resource Manager (mark of Microsoft Corporation), to obtain resources to support sandboxed execution. This orchestration module 904 also communicates with a version control system 920 to obtain source code for a workload 820 to be built and executed in sandboxes 218. This orchestration module 904 also communicates with a task tracker 932, such as an Azure® CosmosDB (mark of Microsoft Corporation) or other task tracker.

FIG. 9 also shows a storage module 924, which communicates with the orchestration module 904 and with a VMSS agent 922. The VMSS 922 includes the sandboxes 218 with respective workload builders 902, such as Docker® builders (mark of Docker, Inc.), or the like, and workload runners 618. The storage module 924 includes a catalog, registry, list, collection, or other set of data about the fleet 204 overall and about individual sandboxes 218 in particular. In the illustrated example, such fleet and sandbox data are organized as registry metadata 926, registry storage 928, and base image records 930.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Some embodiments use or provide a tiered scalability sandbox fleet system 202. This example system includes a processor 110, a memory 112 in operable communication with the processor, a sandbox fleet controller 206, and a sandbox fleet 204. The sandbox fleet includes at least one sandbox network stack 212, with each sandbox network stack in operable communication with the sandbox fleet controller. Each sandbox network stack 212 includes a stack isolation device 214, such as a router 512 or firewall 514 or NAT/PAT device 516, which is connectable to a wide area network 210 and configured to allow network communication from within the sandbox network stack toward the wide area network (WAN). Each sandbox network stack 212 also includes a sandbox network 216. Each sandbox network includes at least one sandbox 218. Each sandbox includes a sandbox virtual machine 220 and a sandbox isolation device 222, such as a switch 510, which is connectable to the stack isolation device for network communication. The sandbox fleet 204 is scalable by altering the number of sandboxes in a given sandbox network of a given sandbox network stack in the sandbox fleet, and the sandbox fleet 204 is also scalable by altering the number of sandbox network stacks in the sandbox fleet.

In some embodiments, each sandbox network stack 212 is executable as an infrastructure-as-a-service virtual machine 504. In some, each sandbox network stack 212 is executable as a platform-as-a-service virtual machine 502.

In some embodiments, the sandbox fleet controller 206 is executable as one of the following: a managed service 506 running directly on cloud computing hardware 508, or a platform-as-a-service virtual machine 502.

In some embodiments, each sandbox isolation device 222 includes at least one of the following: a virtual switch 510, a virtual router 512. In some embodiments, each sandbox isolation device 222 is configured with an assigned set of two or more network addresses which are not assigned to any other sandbox of the same sandbox network stack 212.

In some embodiments, each stack isolation device 214 includes at least one of the following: a virtual network address translation device 516 (which may be a port translation device 516), a virtual firewall 514. In some embodiments, each stack isolation device 214 is configured with an assigned set of two or more WAN-facing internet protocol addresses which are not assigned to any other sandbox network stack of the sandbox fleet.

In some embodiments, each sandbox network stack 212 includes a hypervisor 612 and a supervisor 614, and the supervisor 614 is configured to report sandbox usage to the sandbox fleet controller 206.

In some embodiments, each sandbox network stack 212 includes a hypervisor 612 and at least two sandboxes 218, and the sandboxes collectively include a plurality of kinds of operating systems 120.

In some embodiments, each sandbox network stack 212 includes a dynamic host configuration protocol server 616 which is configured to assign network addresses to sandboxes in the sandbox network stack.

In some embodiments, each sandbox 218 includes a differencing disk 702.

In some embodiments, each sandbox 218 includes a respective executable workload 620.

In some embodiments, the processor 110 has multiple cores 802, and at least two of the sandboxes on the processor have different core counts. For example, with an eight core host processor, an embodiment may be configured to have one 4-core sandbox and two two-core sandboxes, or eight sandboxes of one-core each, or another combinations of eight cores (or less if not all cores are used). An embodiment may mix sandboxes of different core counts, and may have hybrid core count sandboxes as well.

Other system embodiments are also described herein, either directly or derivable as system versions of described methods or configured media, informed by the extension discussion herein of computing hardware.

Methods

FIG. 10 illustrates an example method 1000 for provisioning and scaling a sandbox fleet 204. A fleet controller 1002 is initialized, e.g., by starting a controller managed service 206, 506 or a controller platform service 206, 502, and then authenticating access to the controller, and specifying initial counts for the sandbox tier size and the stack tier size. Then the embodiment provisions 1004 a sandbox stack 212, assigns 1006 addresses 1008 to the stack isolation device 214, provisions 1010 a sandbox network 216 in the stack 212, and assigns 1012 addresses 1008 to the sandbox isolation device(s) 222. These steps may repeat, as multiple stacks 212 and multiple sandboxes 218 are provisioned and configured. At the sandbox tier level 1016, creating 1020 additional sandbox VMs 220 will scale 1014 the fleet upward, and terminating sandbox VMs 220 will scale 1014 the fleet downward. Similarly, at the stack tier level 1018, creating 1020 additional IaaS VMs 504 will scale 1014 the fleet upward, and terminating IaaS VMs 504 will scale 1014 the fleet downward.

Technical methods shown in the Figures or otherwise disclosed will be performed automatically, e.g., by fleet controller 206, unless otherwise indicated. Methods may also be performed in part automatically and in part manually to the extent action by a human administrator or other human person is implicated, e.g., entering a command at a developer system 226 to scale 1014 a fleet. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIGS. 10 and 11. Steps may be performed serially, in a partially overlapping manner, or fully in parallel. In particular, the order in which flowchart 1000 items or flowchart 1100 items are traversed to indicate the steps performed during a method may vary from one performance of the method to another performance of the method. The traversal order may also vary from one method embodiment to another method embodiment. Steps may also be omitted, combined, renamed, regrouped, be performed on one or more machines, or otherwise depart from the illustrated flow, provided that the method performed is operable and conforms to at least one claim.

Some embodiments use or provide a sandbox fleet tiered scaling method performed in a cloud computing environment. This method includes provisioning 1004 a sandbox network stack which includes a stack isolation device, the sandbox network stack being part of a sandbox fleet; assigning 1006 to the stack isolation device a set of one or more WAN-facing internet protocol addresses; provisioning 1010 a sandbox network within the sandbox network stack, the sandbox network including at least one sandbox, each sandbox including a sandbox virtual machine, a workload, and a sandbox isolation device; assigning 1012 to each sandbox isolation device in the sandbox network stack a respective set of one or more network protocol addresses; and scaling 1014 the sandbox fleet by at least one of the following: altering 1102 the number of sandboxes in a given sandbox network of a given sandbox network stack in the sandbox fleet, or altering 1104 the number of sandbox network stacks in the sandbox fleet.

In some embodiments, scaling 1014 the sandbox fleet comprises provisioning 1010 a sandbox in less than thirty seconds.

In some embodiments, the method includes provisioning 1004 a plurality of sandbox network stacks within respective infrastructure-as-a-service virtual machines, each sandbox network stack including a respective sandbox network.

In some embodiments, the method includes deploying 1114 sandbox network stacks as a virtual machine scale set.

In some embodiments, the method includes running 1116 a plurality of workloads in respective sandbox virtual machines.

In some embodiments, the method includes preventing 1118 unauthorized communication 1120 between any two or more sandboxes, where authorized communication is limited to communication which travels over the internet between sandbox isolation devices.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as a sandbox network 216, a sandbox network stack 212, cloud 500 items shown in FIG. 5, or other artifacts shown in FIGS. 1-9, in the form of data 118 and instructions 116, read from a removable storage medium 114 and/or another source such as a network connection, to form a configured storage medium. The configured storage medium 112 is capable of causing a computer system to perform technical process steps for tiered sandbox fleet scaling, as disclosed herein. The Figures thus help illustrate configured storage media embodiments and process embodiments, as well as system and process embodiments. In particular, any of the process steps illustrated in FIG. 10 or 11, or otherwise taught herein, may be used to help configure a storage medium to form a configured storage medium embodiment.

Some embodiments use or provide a storage medium 112, 114 configured with code which upon execution by one or more processors performs a sandbox fleet tiered scaling method which includes identifying 1122 a sandbox fleet (e.g., by a controller API identifier, token, certificate, or other identifier) which includes at least two sandbox network stacks 212, each sandbox network stack including a sandbox network 216 which includes at least one sandbox 218. This method also includes scaling 1014 the sandbox fleet by at least one of the following: altering 1102 the number of sandboxes in a given sandbox network of a given sandbox network stack in the sandbox fleet, or altering 1104 the number of sandbox network stacks in the sandbox fleet.

In some embodiments, the method includes increasing 1128 the number of sandbox network stacks in the sandbox fleet and also includes increasing 1124 the number of sandboxes in a given sandbox network of a given sandbox network stack in the sandbox fleet.

Additional Examples and Observations

One of skill will recognize that not every part of this disclosure, or any particular details therein, are necessarily required to satisfy legal criteria such as enablement, written description, or best mode. Also, embodiments are not limited to the particular programming languages, tool contexts, identifiers, fields, class definitions, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments use or provide a cloud build sandbox based on Hyper-V® nested virtualization. In the Windows Server® 2016 software, Hyper-V® software started to support nested virtualization which allows one to create a fully functional nested virtual machine on top of an Azure® IaaS VM (marks of Microsoft Corporation). This capability can be used, in particular, to help provide a nested virtual machine for service as a build sandbox.

One solution suitable for use as an Azure® Container Registry Build Service sets up a supervisor service 614 on each Azure® IaaS VM (host VM) in a pool. The supervisor then enables Hyper-V® software 612 and a DHCP server 616 on the host VM 504. In this example, the supervisor 614 creates the nested virtual machines 220 of the sandboxes 218 on the host VM 504. Each sandbox 218 has its own virtual switch 510, 222 which is assigned a separate IP address range, to help isolate the sandboxes and sandbox networks from their counterparts. The supervisor 614 also creates a NAT network on the host VM 504, which allows an internet connection from the sandboxes.

In this example, the supervisor 614 receives a build task from a central event hub 610 and sends a corresponding request to a runner service 618 in the sandbox. The runner service then executes the build task as a workload. The workload 620 can be any Docker® build (mark of Docker, Inc.), shell script, or arbitrary program code or codes. In this example, only the supervisor 614 can access the sandbox 218, and the sandbox 218 cannot directly access any resources in the host VM 504. The solution provides sandboxes which are securely isolated from each other and also from their host environment, even though the sandbox has full outgoing internet access.

In this example, the supervisor 614 monitors sandbox status, and re-provisions the sandbox after the build task or other workload finishes execution or is terminated. The supervisor 614 reports 1106 the sandbox usage to a central monitor service 608, which uses the reported data as signal input for dynamically scaling the host VM pool. This solution is able to provision the sandbox quickly (in tens of seconds) and able to scale 1014 the sandbox fleet efficiently to optimize resource utilization.

Some embodiments use or provide a system for providing a secure scalable sandbox build fleet. This example system 202 includes: a hardware base 208 including compute, network, and storage hardware; a sandbox build fleet monitor 608 running on the hardware base; a sandbox build fleet event hub 610 running on the hardware base; and one or more sandbox stacks 212 running on the hardware base in operable communication with the fleet monitor and the fleet event hub. Each sandbox stack includes one or more sandbox virtual machines 220 running a respective runner 618, switch 510, and build task 620. Each sandbox stack also includes a dynamic host configuration protocol service 616 and a network address translation service 516. Each sandbox stack also includes a hypervisor 612, a supervisor 614, and an infrastructure-as-a-service virtual machine 504. Each sandbox stack is configured with the sandbox virtual machines, the dynamic host configuration protocol service and the network address translation service running on the hypervisor.

In this example, the individual sandbox VMs are isolated from each other by their respective switches and assigned IP ranges. Each dedicated internal virtual switch 510 runs on a separate subnet. In some implementations the individual sandbox VMs may also be isolated from each other by using virtual local area networks (VLANs). In some implementations a given network of individual sandbox VMs on one hypervisor instance are separated from the network of individual sandbox VMs on another hypervisor in at least two ways. One is the use of NAT, and the other is the respective supervisors.

This example solution preloads the base OS image (a Hyper-V® disk) on the IaaS VM and uses it as a parent disk 704 to create a sandbox VM disk 702. The process to create a sandbox VM includes creating a new Hyper-V® differencing disk using the base OS image as parent, and creating a new Hyper-V® VM using the differencing disk (mark of Microsoft Corporation). This approach allows an implementation to quickly provision a sandbox without replicating the base OS image. To recycle a sandbox, the solution simply deletes the VM and the associated differencing disk.

With regard to scaling, in some embodiments scaling can involve two stages. First, if there are additional resources in an individual IaaS VM, scaling can add more sandbox VMs on that IaaS VM. Second, if all IaaS VMs are fully occupied, scaling can provision one or more additional IaaS VMs. Once an IaaS VM is provisioned, it can allow multiple sandbox VMs, which means the average sandbox VM provision time is still shorter than for a sandbox based solely on an IaaS VM.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

CONCLUSION

In short, the teachings provided herein may be applied to provide or use a cloud-based fleet 204 of sandboxes 218 which is scalable along two tiers, namely, a sandbox tier 1016 and a stack tier 1018. Additional sandboxes may be added to a particular sandbox network 216 in a particular sandbox stack 212, or additional sandbox stacks 212 may be added. Isolation of individual sandboxes within a sandbox network is provided by virtual switches 510 or routers 512, and by subnetting. Isolation of sandbox networks is provided by network or port address translation 516, and by running hypervisors 612 in respective infrastructure-as-a-service virtual machines 504. Provisioning efficiency can be provided by the two-tiered architecture, by use of differencing disks 702, by use of virtual machine scale sets 922, and by hybrid core-count sandboxes. Sandboxes may be secured but still have outgoing internet 210 connectivity. Workloads 620 run in the sandbox may include builds, tests of development code, investigations of possible malware, and other tasks.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 10 and 11 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A tiered scalability sandbox fleet system, comprising:
a processor;
a memory in operable communication with the processor;
a sandbox fleet controller; and
a sandbox fleet, the sandbox fleet comprising at least one sandbox network stack, each sandbox network stack in operable communication with the sandbox fleet controller;
each sandbox network stack comprising a stack isolation device which is connectable to a wide area network and configured to allow network communication from within the sandbox network stack toward the wide area network (WAN);
each sandbox network stack also comprising a sandbox network;
each sandbox network comprising at least one sandbox, each sandbox comprising a sandbox virtual machine and a sandbox isolation device which is connectable to the stack isolation device for network communication, each sandbox isolation device dedicated to a respective sandbox virtual machine, each sandbox isolation device including at least one of the following: a virtual switch, a virtual router; and
wherein the sandbox fleet is scalable by altering the number of sandboxes in a given sandbox network of a given sandbox network stack in the sandbox fleet, and the sandbox fleet is also scalable by altering the number of sandbox network stacks in the sandbox fleet.

2. The system of claim 1, wherein each sandbox network stack is executable as an infrastructure-as-a-service virtual machine.

3. The system of claim 1, wherein the sandbox fleet controller is executable as one of the following: a managed service running directly on cloud computing hardware, or a platform-as-a-service virtual machine.

4. The system of claim 1, wherein each stack isolation device includes a virtual network address translation device.

5. The system of claim 1, wherein each sandbox network stack comprises a hypervisor and a supervisor, and the supervisor is configured to report sandbox usage to the sandbox fleet controller.

6. The system of claim 1, wherein each sandbox network stack comprises a hypervisor and at least two sandboxes, and the sandboxes collectively include a plurality of kinds of operating systems.

7. The system of claim 1, wherein each sandbox network stack comprises a dynamic host configuration protocol server which is configured to assign network addresses to sandboxes in the sandbox network stack.

8. The system of claim 1, wherein each sandbox comprises a differencing disk.

9. The system of claim 1, wherein each sandbox further comprises a respective executable workload.

10. The system of claim 1, wherein the system is further characterized in at least one of the following ways:
each stack isolation device is configured with an assigned set of two or more WAN-facing internet protocol addresses which are not assigned to any other sandbox network stack of the sandbox fleet; or each sandbox isolation device is configured with an assigned set of two or more network addresses which are not assigned to any other sandbox of the same sandbox network stack.

11. The system of claim 1, wherein the processor has multiple cores, and at least two of the sandboxes on the processor have different core counts.

12. The system of claim 1, wherein each stack isolation device includes a virtual firewall.

13. A sandbox fleet tiered scaling method performed in a cloud computing environment, the method comprising:
provisioning a sandbox network stack which includes a stack isolation device, the sandbox network stack being part of a sandbox fleet;
assigning to the stack isolation device a set of one or more WAN-facing internet protocol addresses;
provisioning a sandbox network within the sandbox network stack, the sandbox network including at least one sandbox, each sandbox including a sandbox virtual machine, a workload, and a sandbox isolation device, each sandbox isolation device dedicated to a respective sandbox virtual machine, each sandbox isolation device including at least one of the following: a virtual switch, a virtual router;
assigning to each sandbox isolation device in the sandbox network stack a respective set of one or more network protocol addresses; and
scaling the sandbox fleet by at least one of the following: altering the number of sandboxes in a given sandbox network of a given sandbox network stack in the sandbox fleet, or altering the number of sandbox network stacks in the sandbox fleet.

14. The method of claim 13, wherein scaling the sandbox fleet comprises provisioning a sandbox in less than thirty seconds.

15. The method of claim 13, comprising provisioning a plurality of sandbox network stacks within respective infrastructure-as-a-service virtual machines, each sandbox network stack including a respective sandbox network.

16. The method of claim 13, comprising deploying sandbox network stacks as a virtual machine scale set.

17. The method of claim 13, further comprising running a plurality of workloads in respective sandbox virtual machines.

18. The method of claim 13, further comprising preventing unauthorized communication between any two or more sandboxes, where authorized communication is limited to communication which travels over the internet between sandbox isolation devices.

19. A storage medium configured with code which upon execution by one or more processors performs a sandbox fleet tiered scaling method, the method comprising:
identifying a sandbox fleet which includes at least two sandbox network stacks, each sandbox network stack including a sandbox network which includes at least one sandbox which includes a sandbox isolation device and a sandbox virtual machine, each sandbox isolation device dedicated to a respective sandbox virtual machine, each sandbox isolation device including at least one of the following: a virtual switch, a virtual router; and
scaling the sandbox fleet by at least one of the following:
altering the number of sandboxes in a given sandbox network of a given sandbox network stack in the sandbox fleet, or
altering the number of sandbox network stacks in the sandbox fleet.

20. The configured storage medium of claim 19, wherein the method comprises increasing the number of sandbox network stacks in the sandbox fleet and also comprises increasing the number of sandboxes in a given sandbox network of a given sandbox network stack in the sandbox fleet.

* * * * *